United States Patent
Chatterjee et al.

(10) Patent No.: US 11,323,376 B2
(45) Date of Patent: May 3, 2022

(54) BANDWIDTH CONTROL IN A NETWORK ADDRESS TRANSLATION (NAT) ENVIRONMENT

(71) Applicant: Avaya Inc., Basking Ridge, NJ (US)

(72) Inventors: Manish Chatterjee, Pune (IN); Biswajyoti Pal, Pune (IN); Jaydeep Bhalerao, Pune (IN)

(73) Assignee: Avaya Inc., Basking Ridge, NJ (US)

( * ) Notice: Subject to any disclaimer, the term of this patent is extended or adjusted under 35 U.S.C. 154(b) by 640 days.

(21) Appl. No.: 15/163,901

(22) Filed: May 25, 2016

(65) Prior Publication Data
US 2017/0346741 A1    Nov. 30, 2017

(51) Int. Cl.
| | | |
|---|---|---|
| *H04L 12/801* | (2013.01) | |
| *H04L 12/805* | (2013.01) | |
| *H04L 12/851* | (2013.01) | |
| *H04L 29/12* | (2006.01) | |
| *H04L 12/24* | (2006.01) | |
| *H04L 47/10* | (2022.01) | |
| *H04L 47/36* | (2022.01) | |
| *H04L 47/24* | (2022.01) | |
| *H04L 61/2589* | (2022.01) | |
| *H04L 41/0896* | (2022.01) | |
| *H04L 61/2514* | (2022.01) | |

(52) U.S. Cl.
CPC .......... *H04L 47/18* (2013.01); *H04L 41/0896* (2013.01); *H04L 47/24* (2013.01); *H04L 47/36* (2013.01); *H04L 61/2514* (2013.01); *H04L 61/2589* (2013.01)

(58) Field of Classification Search
None
See application file for complete search history.

(56) References Cited

U.S. PATENT DOCUMENTS

| | | | | |
|---|---|---|---|---|
| 2014/0016471 A1* | 1/2014 | Maenpaa | .............. | H04L 67/104 370/235 |
| 2014/0029462 A1* | 1/2014 | Stewart | .................. | H04L 43/06 370/252 |
| 2017/0142165 A1* | 5/2017 | Moore | ................ | H04L 43/0811 |

* cited by examiner

*Primary Examiner* — Christopher M Crutchfield
*Assistant Examiner* — Alan L Lindenbaum

(57) ABSTRACT

Embodiments disclosed herein provide systems and methods for controlling bandwidth across a network address translation (NAT) system. In a particular embodiment a method provides, identifying a first endpoint and a second endpoint to a communication session. The first endpoint is located within a domain of the NAT system and the second endpoint is located outside to the domain. The method further provides determining a bandwidth limitation for the communication session and exchanging communications between the first and second endpoints in accordance with the bandwidth limitation.

14 Claims, 6 Drawing Sheets

BANDWIDTH CONTROL IN A NETWORK ADDRESS TRANSLATION (NAT) ENVIRONMENT

TECHNICAL FIELD

Aspects of the disclosure are related to communications with at least one endpoint within a NAT environment and, in particular, to limiting the bandwidth of communications exchanged with that endpoint.

TECHNICAL BACKGROUND

Modern packet based communication protocols, such as Web Real-Time Communication (WebRTC) and Session Initiation Protocol (SIP), media for communications into a NAT environment flows through a TURN server at the network's edge. Typically, a TURN server opens up a relay through which all the communication's media packets traverse so that those packets are not blocked by a firewall protecting systems in the NAT environment. However, the TURN server does not perform flow-control on the packets through the relay for users, tenants, and domains.

OVERVIEW

Embodiments disclosed herein provide systems and methods for controlling bandwidth across a network address translation (NAT) system. In a particular embodiment a method provides, identifying a first endpoint and a second endpoint to a communication session. The first endpoint is located within a domain of the NAT system and the second endpoint is located outside to the domain. The method further provides determining a bandwidth limitation for the communication session and exchanging communications between the first and second endpoints in accordance with the bandwidth limitation.

In some embodiments, exchanging communications between the first and second endpoints in accordance with the bandwidth limitation comprises opening a relay path having the bandwidth limitation for the communication session through a relay system and passing communications between the first and second endpoints via the relay path.

In some embodiments, the relay system comprises a Traversal Using Relays around NAT (TURN) server.

In some embodiments, identifying the first endpoint comprises receiving a TURN allocation request from the first endpoint.

In some embodiments, determining a bandwidth limitation for the communication session comprises receiving an indication of a maximum bandwidth required for the communication session from the first endpoint, setting the bandwidth limitation to at least the maximum bandwidth required for the communication session, and including the bandwidth limitation in a TURN allocation response to the first endpoint.

In some embodiments, the maximum bandwidth required for the communication session is based upon at least one of a quality of service (QoS) requirement, a bandwidth allocation policy, and a location of the first endpoint.

In some embodiments, determining a bandwidth limitation for the communication session further comprises receiving an indication of a maximum bandwidth required for the communication session from the first endpoint and, if not enough bandwidth is available to satisfy the maximum bandwidth required for the communication session, setting the bandwidth limitation to an available amount of bandwidth and notifying the first endpoint of the bandwidth limitation.

In some embodiments, the method further provides, in response to a request for a network address of the second endpoint, providing the network address and the bandwidth limitation to the first endpoint.

In some embodiments, the first endpoint uses the network address to exchange communications with the second endpoint in accordance with the bandwidth limitation.

In some embodiments, the NAT system includes a network firewall.

In another embodiment, a communication control system is provided that includes one or more computer readable storage media and a processing system operatively coupled with the one or more computer readable storage media. Program instructions stored on the one or more computer readable storage media, when read and executed by the processing system, direct the processing system to identify a first endpoint and a second endpoint to a communication session. The first endpoint is located within a domain of the NAT system and the second endpoint is located outside to the domain. The program instructions further direct the processing system to determine a bandwidth limitation for the communication session and exchange communications between the first and second endpoints in accordance with the bandwidth limitation.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Figure 1:
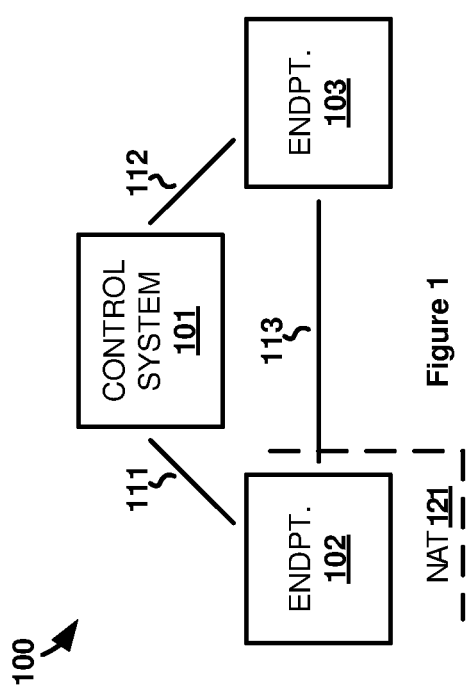
FIG. 1 illustrates a communication system for controlling bandwidth in a NAT environment.

FIG. 1 illustrates communication system 100 for controlling bandwidth in a NAT environment. Communication system 100 includes communication control system 101, endpoint 102, and endpoint 103. Endpoint 102 in this example is located within NAT environment 121. Communication control system 101 and endpoint 102 communicate over communication link 111. Communication control system 101 and endpoint 103 communicate over communication link 112. Endpoint 102 and endpoint 103 communicate over communication link 113.

In operation, endpoint 102 may be located behind a firewall or some other type of network element that would provide and/or regulate communication access to NAT environment 121. Communication control system 101 is a system that assists elements outside of NAT environment 121 to communicate with endpoint 102 or some other element within NAT environment 121. In some examples, communication control system 101 may be a Traversal Using Relays around NAT (TURN) server. In other examples, communication control system 101 may be a Session Traversal of User Datagram Protocol Through Network Address Translators (STUN) server. While typical TURN and STUN servers are unable to regulate the flow of packet communication traffic going into and coming out of NAT environment 121, communication control system 101 determines an amount of bandwidth required for a communication and allots that amount of bandwidth to the communication if available.

Figure 2:
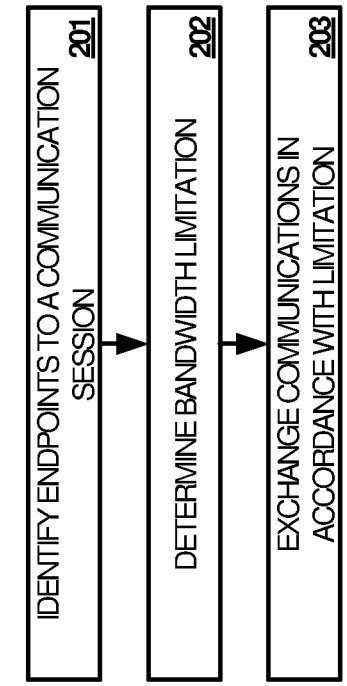
FIG. 2 illustrates an operation of the communication system to control bandwidth in a NAT environment.

FIG. 2 illustrates method 200 for operating communication system 100 to control bandwidth in a NAT environment. Method 200 provides communication control system 101 identifying a first endpoint and a second endpoint to a communication session (201). In this example, endpoint 102 is the first endpoint located within the domain of NAT environment 121 and endpoint 103 is the second endpoint. In some examples, endpoint 103 may be located within a different NAT environment and may also be associated with another communication control system similar to communication control system 101. Communication control system 101 may be informed about the identities of endpoint 102 and endpoint 103 through signaling used to establish packet media (e.g. audio, video, etc.) communications for the communication session. The signaling may use WebRTC, SIP, or some other signaling protocol. For instance, communication control system 101 may receive a request from endpoint 102 to exchange media for a communication session with endpoint 103 (or vice versa) and that request identifies endpoint 102 and endpoint 103.

Method 200 then provides communication control system 101 determining a bandwidth limitation for the communication session (202). The bandwidth determination may be determined based on a Quality of Service (QoS) requirement for endpoint 102 and/or endpoint 103, based on a bandwidth allocation policy, based on the bandwidth currently available for communication sessions, based on limitations of NAT environment 121, based on limitations or policies of a communication network or NAT environment in which endpoint 103 is located, based on limitations or policies of other intervening systems or networks, or on some other bandwidth factor—including combinations thereof.

For example, in order to provide the communication session with a particular level of QoS, communication control system 101 may determine a maximum amount of bandwidth that the communication session will require. Communication control system 101 may then set that maximum amount of bandwidth to be the bandwidth limitation so that the communication session will have that bandwidth available should it be needed at any point during the communication session. In some cases, if the maximum amount of bandwidth is not available, then communication control system 101 may set the bandwidth limit to whatever bandwidth value is available. Communication control system 101 may then notify endpoint 102 and/or endpoint 103 of the limitation.

Method 200 then provides exchanging communications between endpoint 102 and 103 in accordance with the bandwidth limitation. In some cases, communication control system 101 may open a relay through with the communications pass into and out of NAT environment 121. The relay is established so as to ensure the communications pass into and out of NAT environment 121 within the bandwidth limitation. In alternative examples, communication control system 101 facilitates a more direct communication exchange between endpoint 102 and endpoint 103 by providing each with external network addresses of the other. Also, communication control system 101 provides the bandwidth limitation to endpoint 102 and endpoint 103 so that they can self-regulate the communications based on the bandwidth limitation.

Referring back to FIG. 1, communication control system 101 comprises a computer processing system and communication interface. Communication control system 101 may also include other components such as a router, server, data storage system, and power supply. Communication control system 101 may reside in a single device or may be distributed across multiple devices. While shown outside of NAT environment 121, communication control system 101 may be located within NAT environment 121. Communication control system 101 may comprise a communication gateway, firewall, TURN server, STUN server, proxy server, or some other networking system—including combinations thereof.

Endpoints 102 and 103 each comprise communication circuitry and processing circuitry. The communication circuitry may include wired communication components and/or wireless communication components, such as an amplifier, filter, modulator, and signal processing circuitry. Endpoints 102 and 103 may also include a user interface, memory device, software, or some other communication components. Endpoints 102 and 103 may be a telephone, tablet, watch, computer, gateway, e-book, mobile Internet appliance, network interface card, media player, game console, or some other communication apparatus—including combinations thereof.

Communication links 111-113 could use various communication protocols, such as Time Division Multiplex (TDM), Internet Protocol (IP), Ethernet, communication signaling, Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other communication format—including combinations thereof. Communication links 111-113 could be direct links or may include intermediate networks, systems, or devices.

Figure 3:
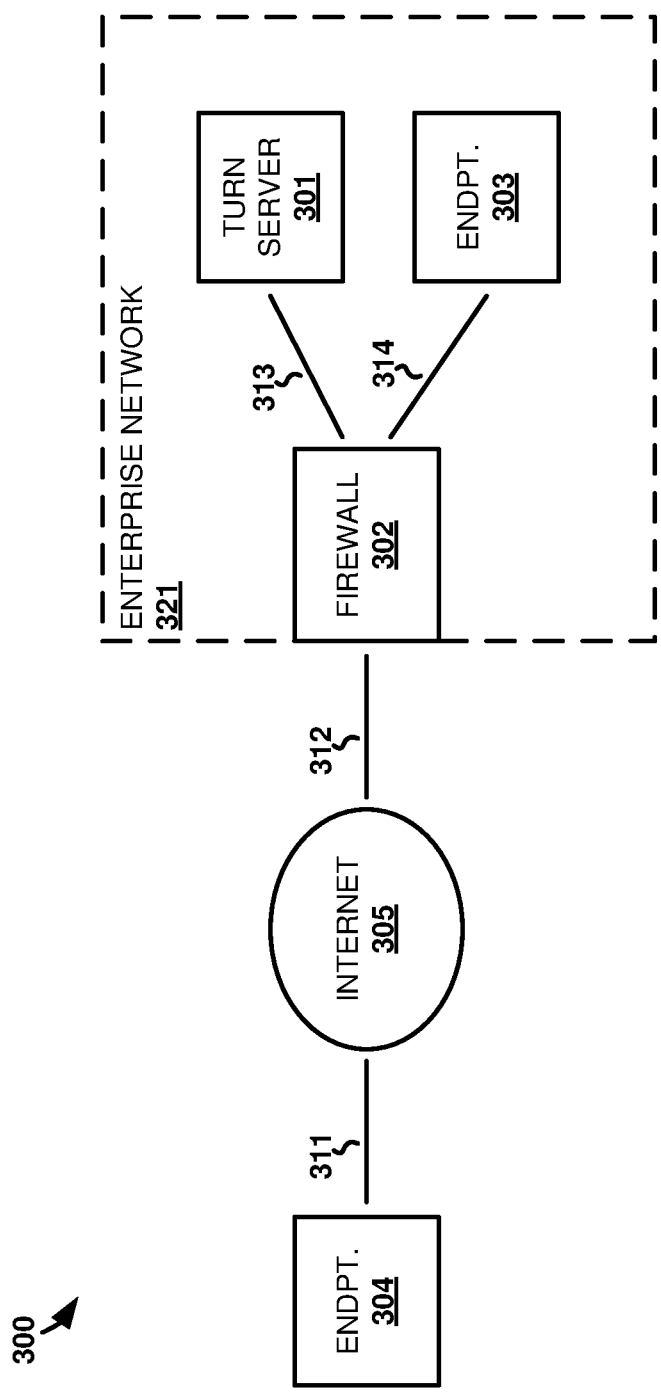
FIG. 3 illustrates another communication system for controlling bandwidth in a NAT environment.

FIG. 3 illustrates communication system 300 for controlling bandwidth in a NAT environment. Communication system 300 includes TURN server 301, firewall 302, endpoint 303, endpoint 304, and Internet 305. Endpoint 304 and Internet 305 communicate over communication link 311. Internet 305 and firewall 302 communicate over communication link 312. Firewall 302 and TURN server 301 communicate over communication link 313. Firewall 302 and endpoint 303 communicate over communication link 314. While not shown, a link between TURN server 301 and endpoint 303 may also exist.

In operation, TURN server 301, firewall 302, and endpoint 303 are located within enterprise communication network 321. Enterprise communication network 321 in this example comprises a NAT environment with firewall 302 at its edge. Firewall 302 is meant to protect enterprise communication network 321 from threats going into and/or leaving enterprise communication network 321. While not shown, enterprise communication network 321 may also include routers, gateways, switches, or some other networking equipment—including combinations thereof. In some examples, endpoint 304 may be located in a NAT environment with a TURN server similar to enterprise communication network 321 and TURN server 301. While shown separately, TURN server 301 and firewall 302 may be incorporated into one another.

Figure 4:
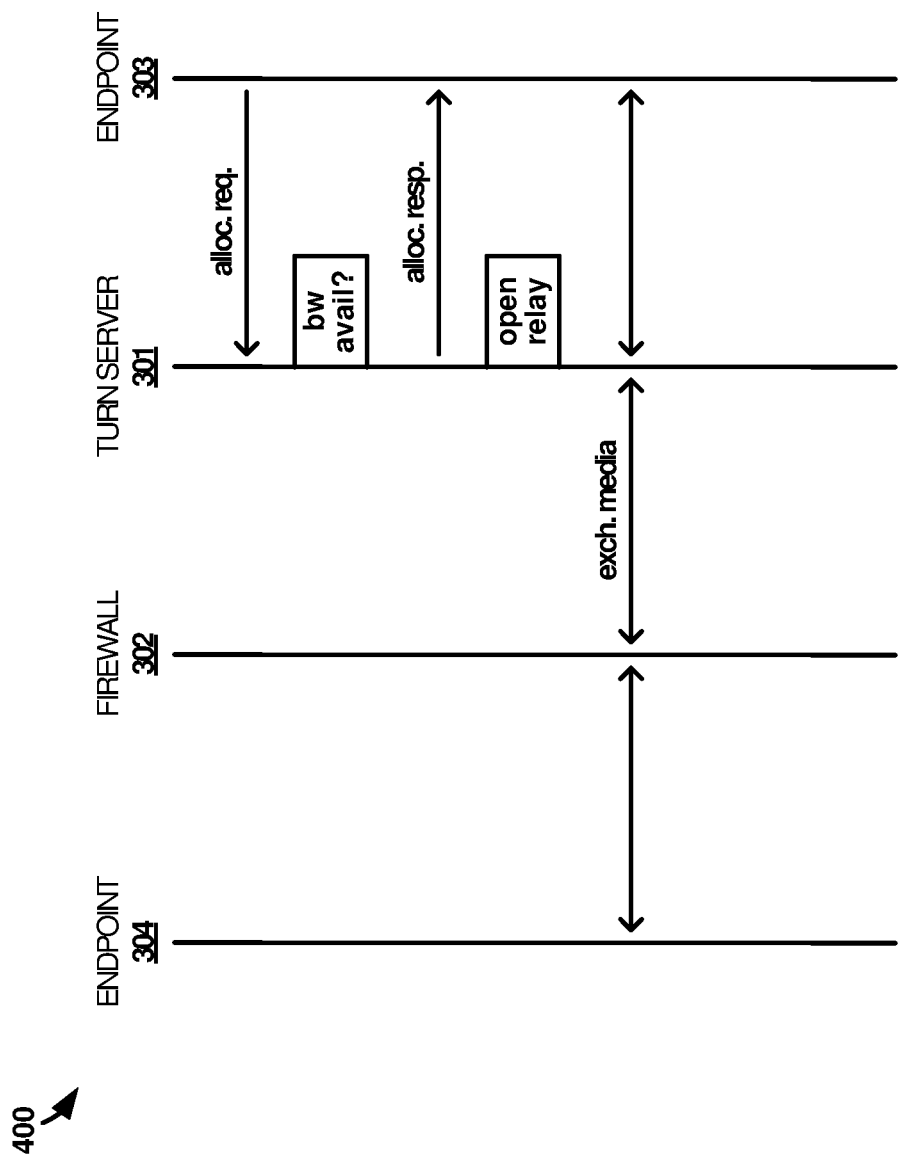
FIG. 4 illustrates an operation of the other communication system to control bandwidth in a NAT environment.

FIG. 4 illustrates operational scenario 400 of communication system 300 to control bandwidth in a NAT environment. In scenario 400, endpoint 303 is a TURN client that exchanges signaling to establish a call (audio, video, text, or otherwise) with endpoint 304. The signaling may be Session Description Protocol (SDP) signaling for WebRTC, SIP, or some other out of band signaling for another protocol. Through that exchange of signaling endpoint 303 is aware of the maximum bandwidth required for the call. This maximum bandwidth may be determined from information included at either or both of endpoint 303 and endpoint 304, an application server for the call, a communication policy server, or any other system that may be involved during the signaling exchange to set up the call. Endpoint 303 transfers a TURN allocation request to TURN server 301. The TURN allocation request includes, with the attribute BAND-WIDTH-RESERVATION, an indication of the maximum bandwidth as a request to reserve that amount of bandwidth through a relay of TURN server 301 for the call.

The maximum bandwidth is associated with the Allocation Request for the tuple of TURN allocation consisting of a relay IP address in TURN server 301, a port number, transport, endpoint 303 address and port. This provides a bandwidth and media packet flow control through the relay address of TURN server 301 for the specific TURN allocation request pertaining to call. The bandwidth reservation will be persistent for the life time of the turn allocation as specified in the turn allocation request. If the requested amount of bandwidth is available, TURN server 301 notifies TURN server 301 that the amount of bandwidth is reserved by sending a TURN allocation response in a TURN allocation response. If the request amount of bandwidth is not available and has to be modified to a lesser amount, TURN server 301 modifies the bandwidth value and notifies endpoint 303 by sending the value in the attribute BAND-WIDTH-RESERVED in the TURN allocation response. Also, in the case of dynamically changing bandwidth of the relay through TURN server 301, a new bandwidth value can be sent to endpoint 303 in the attribute BANDWIDTH-RESERVATION in a TURN allocation refresh message.

TURN server 301 then opens the relay for transporting the media of the call in response to the TURN allocation request. Endpoint 303 and endpoint 304 are then able to exchange the media (e.g. user communications for the call) through the relay of TURN server 301, which has allocated the amount of bandwidth determined above to the relay. TURN server 301, being a trusted system by firewall 302, allows the media to pass freely into and out of enterprise communication network 321 through firewall 302. Moreover, the use of TURN server 301 allows for the relay to ensure bandwidth for a particular QoS required for the call.

In some examples, TURN server 301 may service different domains/realms and users rather than the single domain of enterprise communication network 321. In those examples, the TURN authentication information in the Turn Allocation Request may act as a qualifier to obtain the bandwidth as per user/domain policy. The policy can be linked with tenants of the domain based on the VLAN ID by which the traffic arrives into the TURN relay. In cases where a policy administered on TURN server 301 or on a separate policy server, TURN server 301 can fetch the policy of a user when authenticating the user for the TURN client and provide the bandwidth that can be allocated on the TURN relay as per policy for that user, domain or tenant based on VLAN ID.

In examples using WebRTC or SIP SDP signaling, an interactive connectivity establishment (ICE) candidate corresponding to a relay candidate will have a bandwidth attribute. Endpoint 303 will provide the maximum bandwidth allowed through the relay across Internet 305, which can be be obtained while authenticating the user. Endpoint 303 can provide the bandwidth attribute while providing the relay candidate. The bandwidth attribute is shared in offer/answer so that local endpoint 303 and far end endpoint 304 are aware of the bandwidth consumed/packets flowing in both the receive and transmit direction. When ICE negotiation is successful through the relay address and the application facilitating the communication session knows that media negotiation would be through the relay, the application can instruct endpoint 303 to send a BANDWIDTH-RESERVATION token on a Channel Bind for the specific peer address which uses the relay address in Turn Allocation. The BANDWIDTH-RESERVATION will be the least value of the bandwidth attribute sent and received in signaling information. TURN server 301 will ensure that the specific Turn Channel will not receive more packets. A far end TURN Server for endpoint 304 (if one is present) can restrict bandwidth on the link in a similar way. In this manner, the bandwidth allocation will be tied on the WAN channel over Internet 305 between the far end peer (which in this case is another TURN Server not endpoint 304 itself) and relay address of the Turn Server. This approach is beneficial in case of any policy where the bandwidth consumption can be controlled on the external WAN between the far end peer and the relay address analogous to bandwidth control between to SIP Gateways in a SIP trunking solution.

Figure 5:
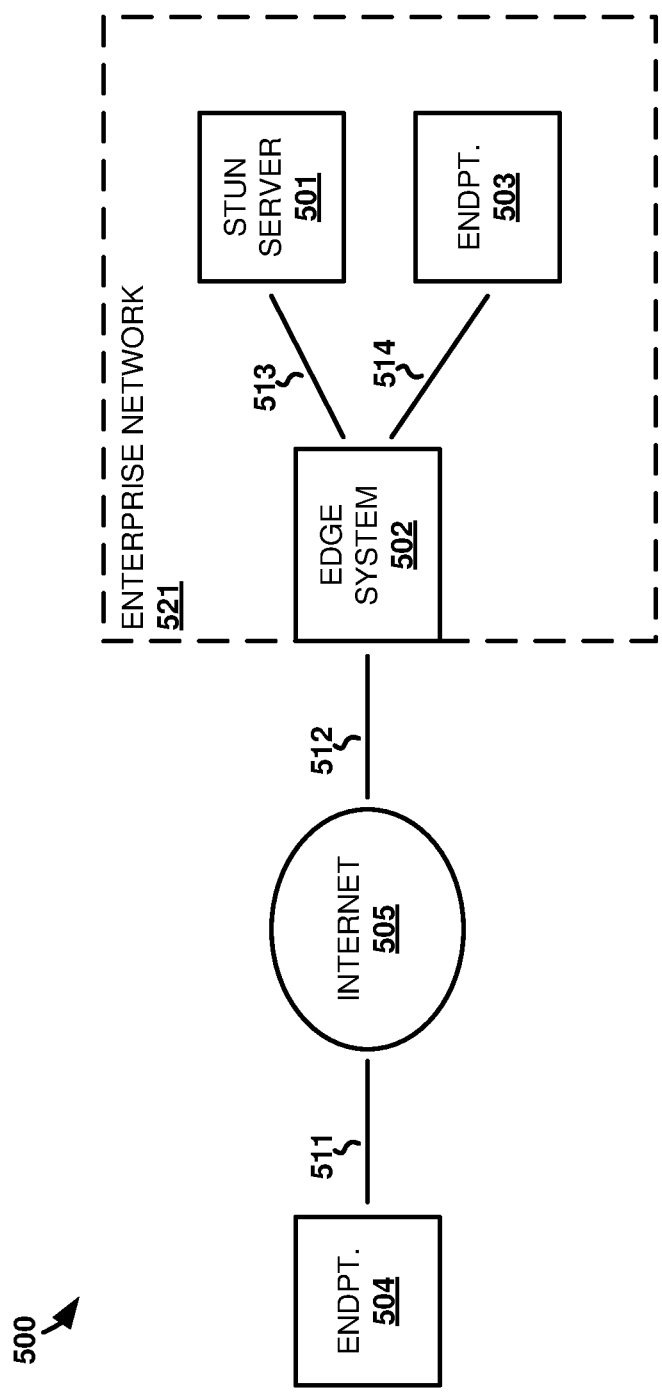
FIG. 5 illustrates illustrates yet another communication system for controlling bandwidth in a NAT environment.

FIG. 5 illustrates illustrates communication system 500 for controlling bandwidth in a NAT environment. Communication system 500 includes STUN server 501, edge system 502, endpoint 503, endpoint 504, and Internet 505. Endpoint 504 and Internet 505 communicate over communication link 511. Internet 505 and edge system 502 communicate over communication link 512. Edge system 502 and STUN server 501 communicate over communication link 513. Edge system 502 and endpoint 503 communicate over communication link 514. While not shown, a link between STUN server 501 and endpoint 503 may also exist.

In operation, STUN server 501, edge system 502, and endpoint 503 are located within enterprise communication network 521. Enterprise communication network 521 in this example comprises a NAT environment with edge system 502. While the edge system in enterprise communication network 321 comprised firewall 302, edge system 502 does not necessarily contain a firewall that would otherwise block media communications not transferred through a TURN relay. While not shown, enterprise communication network 521 may also include routers, gateways, switches, or some other networking equipment—including combinations thereof. In some examples, endpoint 304 may be located in a NAT environment with a STUN server similar to enterprise communication network 521 and STUN server 501. While shown separately, edge system 502 and STUN server 501 may be incorporated into one another.

Figure 6:
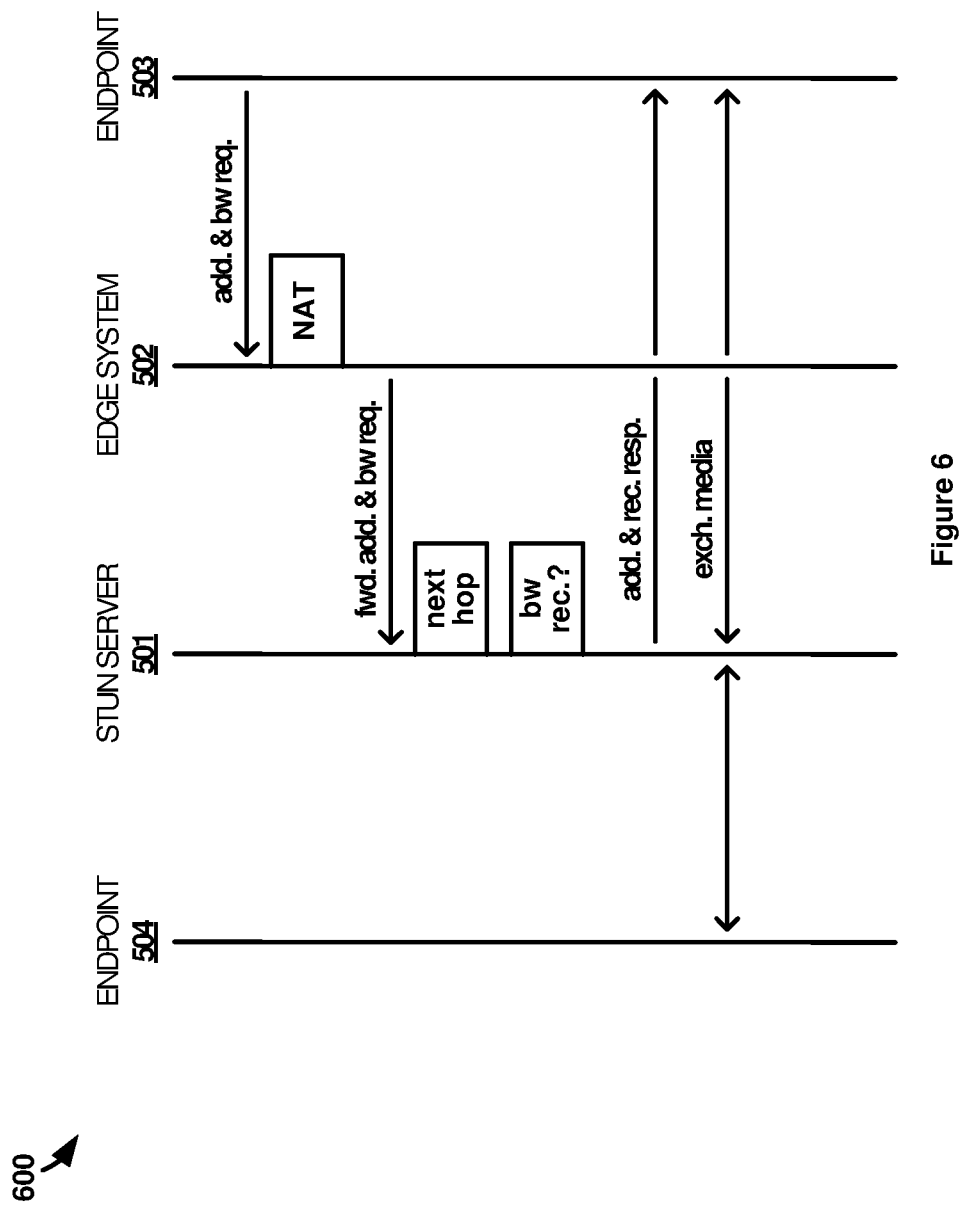
FIG. 6 illustrates an operation of the other communication system to control bandwidth in a NAT environment.

FIG. 6 illustrates operational scenario 600 of communication system 500 to control bandwidth in a NAT environment. In scenario 600, endpoint 503 requests a network address, and port, for endpoint 503 to be used by endpoint 504, which is external to enterprise communication network 521. The request first passes through edge system 502 where edge system 502 performs network address translation on the source of the request (i.e. endpoint 503). Edge system 502 then forwards the request with the translated source on to STUN server 501. STUN server 501 then identifies a next hop address, as a STUN server commonly does, for any request coming from endpoint 503 and passing through edge system 502.

The address request received by STUN server 501 further includes a request for a bandwidth recommendation from STUN server 501. In response to the bandwidth recommendation request, STUN server 501 determines a bandwidth limitation to recommend to endpoint 503. This bandwidth recommendation may be based on many of the same factors used to determine the bandwidth limitation by TURN server 301 above, such as QoS, physical network limitations, active request count from other endpoints, bandwidth policies, or some other factor—including combinations thereof. STUN server 501 responds with the requested next hop address, port, and the bandwidth recommendation. Endpoint 503 then uses that address and port when establishing an exchange of media packets for the call with endpoint 504. Unlike TURN server 301 from above, the provided address allows the media packets to not pass through a relay in STUN server 501.

In some examples, endpoint 504 may provide a host and reflexive candidate. Endpoint 504 sends a STUN binding request to STUN server 501. STUN server 501 identifies next hop address from which the STUN Binding Request is coming. Based on a network map on STUN server 501 for endpoint 504 or a network in which endpoint 504 is located, STUN server 501 in a STUN Binding Response will provide bandwidth and reflexive address of the far end entity which is the next hop from STUN server 501 doing the final address translation. In this case endpoint 304 will use the bandwidth associated with the reflexive candidate and send it in the offer/answer. The optimal bandwidth will be selected as per offer/answer and it will be applied in Channel Bind to the relay address for the specific far end peer address which is the reflexive address in this case. The network map will contain the bandwidth requirements for the various public WAN links or various public subnets between endpoint 503 and endpoint 504.

Figure 7:
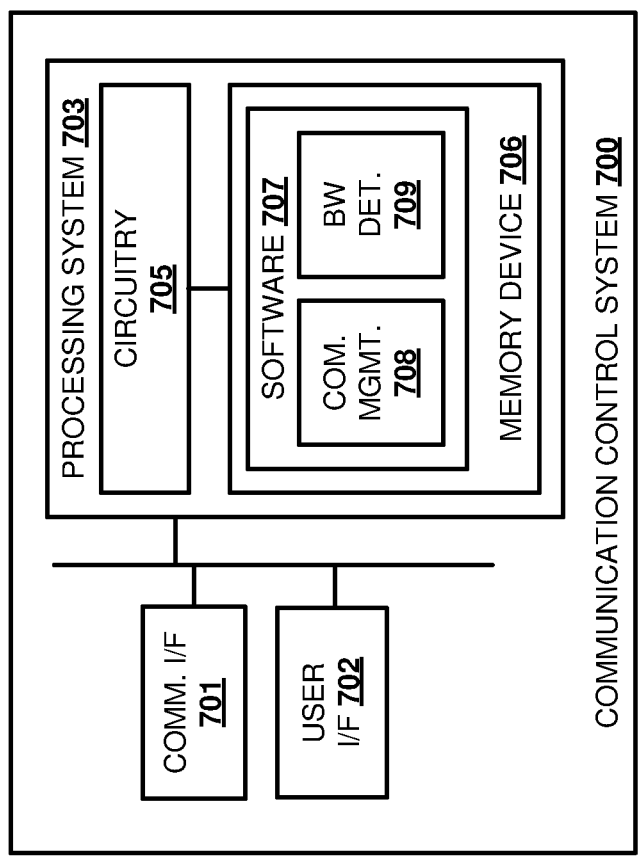
FIG. 7 illustrates a communication control system for controlling bandwidth in a NAT environment.

FIG. 7 illustrates communication control system 700. Communication control system 700 is an example of communication control system 101, although system 101 may use alternative configurations. Communication control system 700 comprises communication interface 701, user interface 702, and processing system 703. Processing system 703 is linked to communication interface 701 and user interface 702. Processing system 703 includes processing circuitry 705 and memory device 706 that stores operating software 707.

Communication interface 701 comprises components that communicate over communication links, such as network cards, ports, RF transceivers, processing circuitry and software, or some other communication devices. Communication interface 701 may be configured to communicate over metallic, wireless, or optical links. Communication interface 701 may be configured to use TDM, IP, Ethernet, optical networking, wireless protocols, communication signaling, or some other communication format—including combinations thereof.

User interface 702 comprises components that interact with a user. User interface 702 may include a keyboard, display screen, mouse, touch pad, or some other user input/output apparatus. User interface 702 may be omitted in some examples.

Processing circuitry 705 comprises microprocessor and other circuitry that retrieves and executes operating software 707 from memory device 706. Memory device 706 comprises a non-transitory storage medium, such as a disk drive, flash drive, data storage circuitry, or some other memory apparatus. Operating software 707 comprises computer programs, firmware, or some other form of machine-readable processing instructions. Operating software 707 includes communication management module 708 and bandwidth determination module 709. Operating software 707 may further include an operating system, utilities, drivers, network interfaces, applications, or some other type of software. When executed by circuitry 705, operating software 707 directs processing system 703 to operate communication control system 700 as described herein.

In particular, communication management module 708 directs processing system 703 to identify a first endpoint and a second endpoint to a communication session, wherein the first endpoint is located within a domain of the NAT system and the second endpoint is located outside to the domain. Bandwidth determination module 709 directs processing system 703 to determine a bandwidth limitation for the communication session. Then, communication management module 708 further directs processing system 703 to facilitate the exchange of communications between the first and second endpoints in accordance with the bandwidth limitation.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for controlling bandwidth in a network address translation (NAT) system, the method comprising:
   identifying a first endpoint and a second endpoint to a communication session, wherein the first endpoint is located within a domain of the NAT system and the second endpoint is located outside to the domain;
   receiving an indication of a maximum bandwidth required for the communication session from the first endpoint;
   setting a maximum bandwidth available for the communication session to at least the maximum bandwidth required for the communication session;
   opening a relay path for the communication session, wherein the relay path comprises a portion of a communication path between the first endpoint and the second endpoint that passes through a relay system and wherein the relay system reserves at least the maximum bandwidth available for the communication session on the relay path for the communication session; and
   passing communications between the first and second endpoints via the relay path.

2. The method of claim 1, wherein the relay system comprises a Traversal Using Relays around NAT (TURN) server.

3. The method of claim 2, wherein identifying the first endpoint comprises:
   receiving a TURN allocation request from the first endpoint.

4. The method of claim 1, comprising indicating the maximum bandwidth available for the communication session in a TURN allocation response to the first endpoint.

5. The method of claim 4, wherein the maximum bandwidth required for the communication session is based upon at least one of a quality of service (QoS) requirement, a bandwidth allocation policy, and a location of the first endpoint.

6. The method of claim 1, comprising:

after setting the maximum bandwidth available for the communication session, if not enough bandwidth is available to satisfy the maximum bandwidth required for the communication session, setting the maximum bandwidth available for the communication session to an available amount of bandwidth and notifying the first endpoint of the available amount of bandwidth.

7. The method of claim 1, wherein the NAT system includes a network firewall.

8. A communication control system for controlling bandwidth in a network address translation (NAT) system, the communication control system comprising:

one or more computer readable storage media;

a processing system operatively coupled with the one or more computer readable storage media; and program instructions stored on the one or more computer readable storage media that, when read and executed by the processing system, direct the processing system to:

identify a first endpoint and a second endpoint to a communication session, wherein the first endpoint is located within a domain of the NAT system and the second endpoint is located outside to the domain;

receive an indication of a maximum bandwidth required for the communication session from the first endpoint;

set a maximum bandwidth available for the communication session to at least the maximum bandwidth required for the communication session;

open a relay path for the communication session, wherein the relay path comprises a portion of a communication path between the first endpoint and the second endpoint that passes through a relay system and wherein the relay system reserves at least the maximum bandwidth available for the communication session on the relay path for the communication session; and pass communications between the first and second endpoints via the relay path.

9. The communication control system of claim 8, wherein the relay system comprises a Traversal Using Relays around NAT (TURN) server.

10. The communication control system of claim 9, wherein to identify the first endpoint the program instructions direct the processing system to at least:

receive a TURN allocation request from the first endpoint.

11. The communication control system of claim 8, wherein to determine a bandwidth limitation for the communication session the program instructions direct the processing system to at least:

indicate the maximum bandwidth available for the communication session in a TURN allocation response to the first endpoint.

12. The communication control system of claim 11, wherein the maximum bandwidth required for the communication session is based upon at least one of a quality of service (QoS) requirement, a bandwidth allocation policy, and a location of the first endpoint.

13. The communication control system of claim 8, wherein the program instructions direct the processing system to:

after the maximum bandwidth available for the communication session is set, if not enough bandwidth is available to satisfy the maximum bandwidth required for the communication session, set the maximum bandwidth available for the communication session to an available amount of bandwidth and notifying the first endpoint of the available amount of bandwidth.

14. The communication control system of claim 8, wherein the NAT system includes a network firewall.

* * * * *